United States Patent [19]

Nimry et al.

[11] 4,417,045
[45] * Nov. 22, 1983

[54] POLYIMIDES AND POLYIMIDE-AMIDES

[75] Inventors: Tayseer S. Nimry, Wheaton; Ellis K. Fields, River Forest, both of Ill.

[73] Assignee: Standard Oil Company (Indiana), Chicago, Ill.

[ * ] Notice: The portion of the term of this patent subsequent to Sep. 9, 1999 has been disclaimed.

[21] Appl. No.: 427,014

[22] Filed: Sep. 29, 1982

Related U.S. Application Data

[63] Continuation-in-part of Ser. No. 294,348, Aug. 19, 1981, Pat. No. 4,358,850.

[51] Int. Cl.$^3$ .................. C08G 73/10; C08G 73/14
[52] U.S. Cl. .................. 528/188; 428/458; 428/473.5; 428/474.4; 528/125; 528/128; 528/172; 528/189; 528/206; 528/208; 528/220; 528/229; 528/352; 528/353
[58] Field of Search .............. 528/188, 189, 125, 128, 528/206, 208, 220, 229, 352, 353, 172; 549/234; 428/458, 473.5, 474.4

[56] References Cited

U.S. PATENT DOCUMENTS

| 3,257,418 | 6/1966 | Vermont | 549/234 |
| 3,299,102 | 1/1967 | Bradshaw | 549/234 |
| 3,413,316 | 11/1968 | Bradshaw | 549/234 |
| 3,423,431 | 1/1969 | Starr et al. | 549/234 |
| 3,472,749 | 10/1969 | Bradshaw et al. | 549/234 |
| 3,503,998 | 3/1970 | Schuller et al. | 549/234 |
| 4,358,580 | 11/1982 | Nimry et al. | 528/188 |
| 4,358,582 | 11/1982 | Nimry et al. | 528/188 |
| 4,360,657 | 11/1982 | Nimry et al. | 528/188 |

Primary Examiner—Lester L. Lee
Attorney, Agent, or Firm—Gunar J. Blumberg; William T. McClain; William H. Magidson

[57] ABSTRACT

Novel polyimides and polyimides-amides, and molding compositions are prepared from novel dianhydrides such as tricyclo[6.4.0.0$^{2,7}$] dodecane-3,6-diphenyl-1,8,4,5-tetracarboxylic acid dianhydride and tricyclo [6.4.0.0$^{2,7}$] dodecane-1,8,4,5-tetracarboxylic acid dianhydride, dicarboxylic acids and diamines. The novel polyimides and polyimides-amides are useful as engineering plastics.

16 Claims, No Drawings

POLYIMIDES AND POLYIMIDE-AMIDES

This application is a continuation-in-part of application Ser. No. 294,348 filed Aug. 19, 1981 and now U.S. Pat. No. 4,358,850.

FIELD OF THE INVENTION

The field of this invention relates to novel polyimides and polyimide-amides prepared from dianhydrides such as tricyclo[6.4.0.0$^{2,7}$]dodecane-1,8,4,5-tetracarboxylic acid dianhydride (I) and tricyclo[6.4.0.0.$^{2,7}$]dodecane-3,6-diphenyl-1,8,4,5-tetracarboxylic acid dianhydride (II) dicarboxylic acids and diamines. These novel polyimides-polyamides are useful in preparing molded articles, fibers, laminates and coatings.

BACKGROUND

British patent specification No. 570,858 discloses various processes for making fiber forming polymers. It is clear that neither the novel dianhydrides nor the polyimides prepared therefrom, which are useful as moldings, fibers, laminates and coatings, have been contemplated in the prior art.

The general objective of this invention is to provide novel dianhydrides. A more specific object is to provide novel polyimides-polyamides and copolyimides-copolyamides based on I, II and diamines. Another object is to provide polyimides-polyamides based on either I or II and other dianhydrides with dicarboxylic acids and diamines or mixtures of diamines.

We have found that novel polyimides-polyamides can be formed by reacting dianhydrides of the following structure:

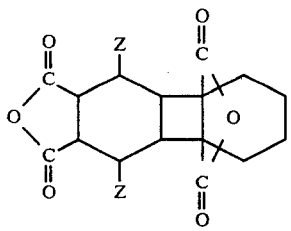

wherein Z is either hydrogen or a benzene radical and dicarboxylic acids or their derivatives with diamines. The dicarboxylic acids having the following general formula:

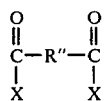

where X is OH, Cl, or O alkyl and R'' is a divalent aromatic or aliphatic radical and wherein the O-alkyl group comprises about 1 to about 5 carbon atoms. Advantageously R is a divalent aliphatic hydrocarbon containing about 2-18 carbon atoms or aromatic divalent radical containing about 1-3 benzene rings, or heterocyclic hydrocarbon, or a mixture of these. Useful dicarboxylic acids include such acids or their halides or esters as oxalic, glutaric, adipic, azelaic, terephthalic, isophthalic, biphenyl-4,4'-dicarboxylic, 2,6-naphthalene dicarboxylic, and pyridine-2,4- and 3,5-dicarboxylic.

The dianhydrides are prepared by photocycloaddition reactions between 1-cyclohexene-1,2-dicarboxylic anhydride and 3,6-diphenyl-4-cyclohexene 1,2-dicarboxylic anhydride and photocycloaddition reactions between cis-4-cyclohexene-1,2-dicarboxylic anhydride and cis-1-cyclohexene-1,2-dicarboxylic anhydride. Both I and II react readily with a diamine to form a high-molecular-weight polyimide or copolyimide. In the novel process aliphatic, cycloaliphatic, araliphatic and aromatic diamines can be polymerized with I and II in the melt to form high molecular weight polyimides and copolyimides.

Dianhydrides that can be mixed with I or II in a ratio that ranges from about 10:1 to about 1:10 as monomers for the synthesis of copolyimides are characterized by the following formula:

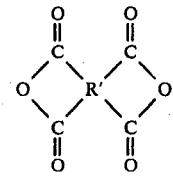

wherein R' is a tetravalent organic radical selected from the group consisting of aromatic, aliphatic, cycloaliphatic, heterocyclic, combination of aromatic and aliphatic, and substituted groups thereof. However, the preferred dianhydrides are those in which the R' groups have at least 6 carbon atoms, wherein the 4 carbonyl groups of the dianhydride are each attached to separate carbon atoms and wherein each pair of carbonyl groups is directly attached to adjacent carbon atoms in the R' group to provide a 5-membered ring as follows:

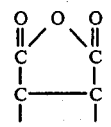

The preferred dianhydrides mixed with either I or II, as recited above, yield upon reaction with the diamines copolyimide structures having outstanding physical properties. Illustrations of dianhydrides in addition to either I or II suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 1,2,3,4-cyclopentane tetracarboxylic dianhydride; 2,2',3,3'-diphenyl tetracarboxylic dianhydride; 2,2-bis(3,4-dicarboxyphenyl)propane dianhydride; 2,3,4,5-pyrrolidine tetracarboxylic dianhydride; 3,4,9,10-perylene tetracarboxylic dianhydride; bis(3,4-dicarboxyphenyl)ether dianhydride; ethylene tetracarboxylic dianhydride; 3,3',4,4'-benzophenone tetracarboxylic dianhydride; bis(3,4-dicarboxyphenyl)sulfide dianhydride; bis(3,4-dicarboxyphenyl)sulfone dianhydride; bis(3,4-dicarboxyphenyl)methane dianhydride; 1,4,5,8-naphthalenetetracarboxylic dianhydride; tricyclo[4,2,2,0$^{2,5}$]dec-7-ene-3,4,9,10-tetracarboxylic dianhydride; 3,6-ethenohexahydropyrometallitic dianhydride; cyclobutane-1,2,3,4-tetracarboxylic dianhydride; and 1,3-dimethylcyclobutane-1,2,3,4-tetracarboxylic dianhydride; 1,2,3,4-tetramethyl-1,2,3,4-tetracarboxylic dianhydride.

Our process for the manufacture of the novel polyimides-polyamides comprises reacting about equal molar amounts of the dianhydride and dicarboxylic acid with a primary diamine or a mixture of primary diamines. The molecular ratio of the dianhydride to the primary diamine may be in the range of about 1.2 to 1 preferably in the range of about 1 to 1. The ratio of the dianhydrides to the dicarboxylic acid can be about 10:2 to about 2:10 preferably, about 1:2 to about 2:1. Suitably, the reaction is conducted as a batch reaction at a temperature of about 130° C. to 300° C. for a period of about 2 to 8 hours in a nitrogen-containing organic polar solvent such as N-methyl-2-pyrrolidinone, N,N-dimethylacetamide or pyridine. The polycondensation can also be carried out as a continuous process. The polycondensation can suitably be carried out at a temperature of 130° C. to 300° C., preferably at a temperature of 180° C. to 250° C. The novel polyimides-polyamides of this invention have the following recurring structure wherein R is a divalent aliphatic or aromatic hydrocarbon radical and Z is a hydrogen or benzene radical:

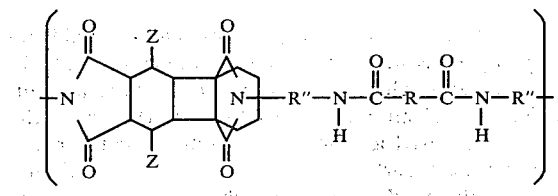

The radical R" may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene

—SO—, —SO$_2$—, and —S— radicals. R is an aliphatic radical comprising about 2 to 18 carbon atoms or an aromatic hydrocarbon comprising 6 to 20 carbon atoms and is derived from the dicarboxylic acids discussed herein.

The radical R" is derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylene diamine, 4,4'-diaminodicyclohexylethane, xylylene diamine and bis-(aminomethyl)cyclohexane. Suitable aromatic diamines useful in Applicant's process include para- and meta-phenylenediamine, 4,4'-oxydianiline, thiobis(aniline), sulfonylbis(aniline), diaminobenzophenone, methylenebis(aniline), benzidine, 1,5-diaminonaphthalene, oxybis(2-methylaniline), thiobis(2-methylaniline), and the like. Examples of other useful aromatic primary diamines are set out in U.S. Pat. No. 3,494,890 (1970) and U.S. Pat. No. 4,016,140 (1972) both incorporated herein by reference. The preferred diamines are hexamethylene diamine, dodecamethylene diamine and 4,4'-oxydianiline.

In some cases the polyimide-polyamide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyimide and can be conducted in several ways. However, all techniques require heating the ground or pelletized polyimide below the melting point of the polyimide, generally at a temperature of about 175° to 300° C. while either sparging with an inert gas, such as nitrogen or operating under vacuum. In cases where the polyimides have a low melt temperature, they can be polymerized in the melt under vacuum in thin sections or using thin film reactors known in the art.

Injection molding of the novel polyimide-polyamide is accompanied by injecting the polyimide into a mold maintained at a temperature of about 25° C. to 150° C. In this process a 20 second to 1 minute cycle is used with a barrel temperature of about 125° C. to 350° C. The latter will vary depending on the Tg of the polymer being molded.

The novel polyimides-polyamides have excellent mechanical and thermal properties and can readily be molded into useful articles or formed into fibers, films, laminates or coatings. Infrared spectra of the polyimides-polyamides have confirmed the polyimide-polyamide structure. Glass transition temperature Tg of the polyimide-polyamide varied with the particular diamine used as shown in the Examples. Values range from a Tg of 70° C. to 180° C.

Diamines with the amino groups attached directly to the aromatic ring are suitably polymerized with I or II by solution condensation in organic polar solvents. We have found that the polyimides-polyamides and copolyimides-copolyamides of this invention are improved by the addition of reinforcing material. Suitably about 25 to 60 percent by weight glass fibers, glass beads or graphite or mixtures of these can be incorporated into the polyimides and copolyimides. Any standard commercial grade fibers, especially glass fibers may be used. Glass beads ranging from 5 mm to 50 mm in diameter may also be used as reinforcing material. Injection molding of the novel glass-filled polyimide-polyamide is accomplished by injecting the polyimide into a mold maintained at a temperature of about 50° C. to 150° C. In this process a 25 to 28 second cycle is used with a barrel temperature of about 125° to 350° C. The injection molding conditions are given in Table 1.

TABLE 1

| | |
|---|---|
| Mold Temperature | 50° to 150° C. |
| Injection Pressure | 15,000 to 19,000 psi and held for 1 to 3 seconds |
| Back Pressure | 100 to 220 psi |
| Cycle Time | 25 to 28 seconds |
| Extruder: | |
| Nozzle Temperature | 125° C. to 350° C. |
| Barrels: | |
| Front Heated to | 125° C. to 350° C. |
| Screw: | |
| 20 to 25 revolutions/minute | |

The following examples illustrate the preferred embodiment of the invention. It will be understood that the examples are for illustrative purposes only and do not purport to be wholly definitive with respect to conditions or scope of the invention.

EXAMPLE 1

Synthesis of Tricyclo[6.4.0$^{2,7}$]Docecane-1,8,4,5-tetracarboxylic Acid Dianhydride (I)

I is a derivative of perhydrobiphenylene. It has the following formula:

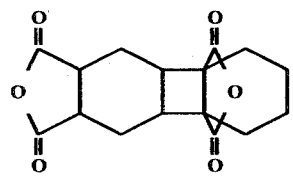

It is prepared from the two related anhydrides, 1-cyclohexene-1,2-dicarboxylic anhydride (III) and its isomer, cis-4-cyclohexene-1,2-dicarboxylic anhydride (IV) in a photocycloaddition reaction.

In a one liter pyrex Erlenmeyer flask, 30.0 g (0.197 mole) of III and 30.0 g (0.197 mole) of IV were dissolved in 350 ml toluene. To this solution approximately 1 g of benzophenone was added. The flask was fitted with a condenser and the solution was irradiated with light from a General Electric (GE) sunlamp. After 18 h, the first crop, 15.2 g, of the product I was isolated. The filtrate was exposed further to light for another 18 h, and 12.0 g of the dianhydride was recovered. At the end of 5 days 60% of the theoretical yield of I was obtained. The new compound melts at 272°-4° C., and decomposes above 290° C. with gas evolution. Analysis: Calcd. for $C_{16}H_{16}O_6$: C,63.2%; H,5.3%. Found: C,63.3%; H,5.4%.

Mass spectral analysis is consistent with the proposed configuration of I. A molecular ion at 304 was detected. The spectrum also showed two intense peaks at 260 (I—$CO_2$) and 232 (I—$CO_2$—CO).

EXAMPLE 2

Synthesis of Tricyclo[6.4.0.0$^{2,7}$]Dodecane-3,6-Diphenyl-1,8,4,5-Tetracarboxylic Acid Dianhydride (II)

II of the following structure:

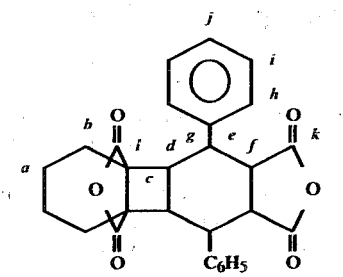

is prepared by the photocycloaddition of 1-cyclohexene-1,2-dicarboxylic anhydride (III) to 3,6-diphenyl-4-cyclohexane-1,2-dicarboxylic anhydride (V). To a one liter pyrex Erlenmeyer flask equipped with a condenser was added 15.2 g (0.1 mol) of (III), 30.4 g (0.1 mol) of (V), and 1.0 g of benzophenone. The mixture was dissolved in 600 ml acetone that was dried over 4 A molecular sieve, then irradiated with light from a GE sunlamp. Crops of II were filtered off at approximately 18 h intervals. A yield of 70% was obtained after 72 h; mp, 360°-5° C. (dec). Analysis: Calcd. for $C_{28}H_{24}O_6$: C,73.68; H,5.26. Found: C,73.51; H,5.39. The $^{13}$C nuclear magnetic resonance spectrum is consistent with the proposed formulation for II.

| C atom | $^{13}C_{Slms}$ | C atom | $^{13}C_{Slms}$ |
|---|---|---|---|
| a | 18.7 ppm | g | 137.2 |
| b | 27.3 | h | 128.1 |
| c | 48.8 | i | 127.9 |
| d | — | j | 126.9 |
| e | 37.7 | k | 171.0 |
| f | 46.9 | l | 173.2 |

EXAMPLE 3

To a stirred solution of 4.0 g (0.02 mole) of 1,12-dodecanediamine in 85 ml of N-methyl-2-pyrrolidinone (NMP) at 85° C. under $N_2$ flowing at 50 cc/min was added at one time a mixture of Compound I, 3.04 g. (0.01 l mole) and 1.94 g (0.01 mole) of dimethylterephthalate. The temperature of the stirred mixture was raised to 180° C. over 2½ hours and kept there for an additional 5 hours. The clear solution was cooled to 90° C. and added to 300 ml of water in a blender. The precipitated white polyimide-polyamide was collected on a filter, washed with 4.50 ml portions of water, and dried in vacuum at 90° C. overnight. It weighed 7.26 g (91% yield) and had an intrinsic viscosity, measured in 60/40 phenol/tetrachloroethane, of 0.79.

Analysis: Calculated for $C_{48}H_{70}N_4O_6$, C,72.2; H,8.8; N,7.0. Found: C,69.7; H,8.4; N,6.8.

EXAMPLE 4

To stirred mixture of 4.56 g. (0.01 mole) of Compound II and 1.94 g. (0.01 mole) of dimethyl isophthalate in 90 ml NMP at 80° C. under $N_2$ at 50 cc/min was added a solution of 1.2 g. (0.02 mole) of 1,6-hexamethylene diamine in 10 ml NMP all at one time. Stirring was continued while the temperature was raised to 170° C. over 1½ hours, kept there for 4 hours, then allowed to cool to 75° C. The NMP solution was added to 450 ml of water in a blender. The precipitated polyimide-polyamide was collected on a filter, washed with water, and dried in a vacuum over at 95° C. for 5 hours. It weighed 6.03 g (90% yield) and had an intrinsic viscosity of 0.88.

Analysis: Calculated for $C_{48}H_{54}N_4O_6$, C,73.7; H,6.9; N,7.2. Found: C,73.4; H,6.8; N,6.8.

EXAMPLE 5

To a stirred solution of 4.0 g. (0.02 mole) of oxybisaniline in 73 ml NMP at 85° C. under $N_2$ at 50 cc/min was added a mixture of 4.56 g. (0.01 mole) of Compound II and 1.46 g (0.01 mole) of adipic acid. The temperature was increased to 160° C. over 1 hour and kept there for 18 hours. Workup as in Example 4 gave 8.18 g. (88% yield) of polyimide-polyamide that had an intrinsic viscosity of 0.49.

Analysis: Calculated for $C_{56}H_{54}N_4O_8$, C,73.8; H,5.9; N,6.2. Found: C,73.3; H,5.5; N,6.4.

We claim:

1. A polyimide prepared from an aromatic or aliphatic diamine and the dianhydrides of the following structure:

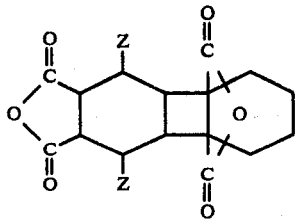

wherein Z is either hydrogen or a benzene radical and wherein the mole ratio of the aromatic, aliphatic or a mixture of aromatic and aliphatic diamines to the dianhydride is about 1.2:1 to about 1:1.

2. A polyimide-amide prepared from an aliphatic or aromatic dicarboxylic acid, and an aliphatic or aromatic diamine and from the dianhydride of the following structure:

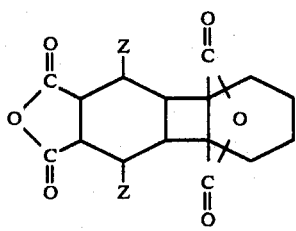

wherein Z is either hydrogen or a benzene radical and wherein the mole ratio of the aromatic, aliphatic or a mixture of aromatic and aliphatic diamines to the total dianhydride and dicarboxylic acid moieties is about 1.2:1 to about 1:1 and the mole ratio of the dianhydride moieties to the dicarboxylic acid moieties is about 10:2 to about 2:10.

3. A polyimide-amide comprising the following recurring structure:

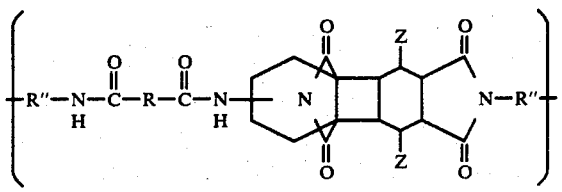

wherein R and R" are the same or different divalent aliphatic, cycloaliphatic, araliphatic or aromatic hydrocarbon radicals and Z is a hydrogen or benzene radical.

4. The polyimide-amide of claim 3 wherein R" is an aliphatic hydrocarbon from about 2 to about 18 carbon atoms.

5. The polyimide-amide of claim 3 wherein R" is an aromatic hydrocarbon from about 6 to about 20 carbon atoms.

6. A polyimide-amide comprising the following recurring structure:

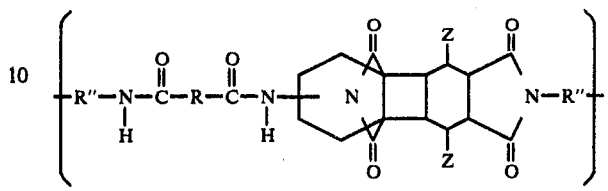

wherein R and R" are the same or different divalent aliphatic, cycloaliphatic, araliphatic hydrocarbon radicals and an aromatic hydrocarbon radical containing from 6 to 10 carbon atoms joined directly or by stable linkage consisting of —O—, methylene,

—SO—, —SO$_2$—, and S radicals.

7. The polyimide-amide of claim 3 wherein the polyimide-amide is in the form of a molded object.

8. The polyimide-amide of claim 3 wherein the polyimide-amide is in the form of a fiber.

9. The polyimide-amide of claim 3 wherein the polyimide-amide is in the form of a film.

10. The polyimide-amide of claim 3 wherein the polyimide-amide is in the form of a metal coating suitable for electrical service.

11. The polyimide-amide of claim 3 wherein R is an aliphatic hydrocarbon from 2 to 18 carbon atoms.

12. The polyimide-amide of claim 3 wherein R is an aromatic hydrocarbon from 6 to 20 carbon atoms.

13. A polyimide comprising the following recurring structure:

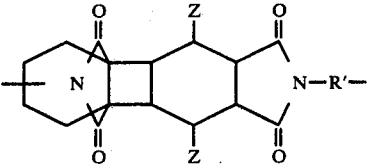

wherein R' is a divalent aliphatic, cycloaliphatic, araliphatic or aromatic hydrocarbon radical and Z is a hydrogen or benzene radical.

14. The polyimide of claim 13 wherein the polyimide is in the form of a molded object.

15. The polyimide of claim 13 wherein the polyimide is in the form of a laminate.

16. The polyimide of claim 13 wherein the polyimide is in the form of a film.

* * * * *

UNITED STATES PATENT OFFICE
CERTIFICATE OF CORRECTION

Patent No. 4,417,045　　　　　　　　　Dated November 22, 1983

Inventor(s) NIMRY, TAYSEER S. — FIELDS, ELLIS K.

It is certified that error appears in the above-identified patent and that said Letters Patent are hereby corrected as shown below:

| Column | Line | | |
|---|---|---|---|
| 1 | 47 | "acids having" | should be -- acids have -- |
| 1 | 55 | "0 alkyl" | should be -- 0-alkyl |
| 2 | 61 | "tricyclo[4,2,2,0$^{2,5}$]" should be -- tricyclo[4.2.2.0$^{2,5}$] -- | |
| 2 | 62 | "3,6-ethenohexahydropyrometallitic" should be -- 3,6-ethenohexahydropyromellitic -- | |
| 5 | 4 | "[6.4.0$^{2,7}$] Docecane" should be -- [6.4.0.0$^{2,7}$] Dodecane -- | |
| 5 | 64 | "over 4A" should be -- over 4Å -- | |
| 6 | 46 | "vacuum over" should be -- vacuum oven -- | |
| 1 | 52 | "-R"-" should be -- -R- -- | |
| 1 | 55 | " R" " should be -- R -- | |

UNITED STATES PATENT OFFICE
CERTIFICATE OF CORRECTION

Patent No. 4,417,045　　　　　　　　　Dated November 22, 1983.

Inventor(s) NIMRY, TAYSEER S. - FIELDS, ELLIS K.

It is certified that error appears in the above-identified patent and that said Letters Patent are hereby corrected as shown below:

Column Line 3　22-29　"

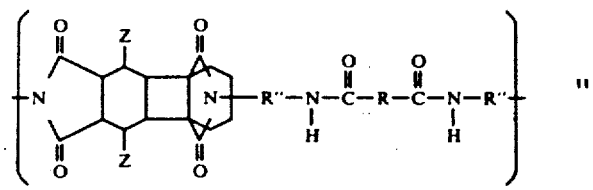

should be

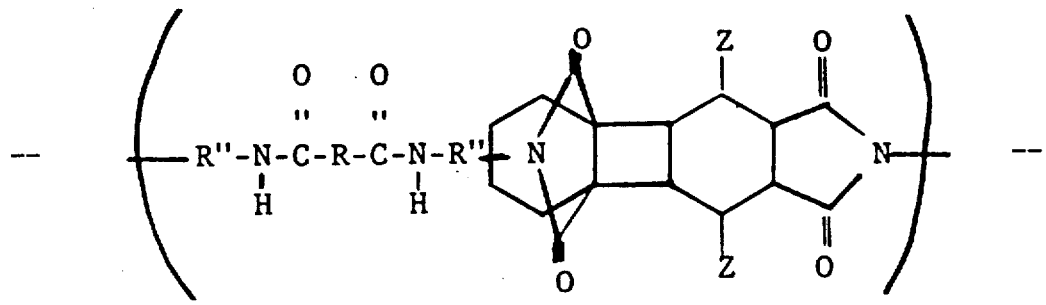

"

UNITED STATES PATENT OFFICE
CERTIFICATE OF CORRECTION

Page 3 of 4

Patent No. 4,417,045  Dated November 22, 1983

Inventor(s) NIMRY, TAYSEER S. - FIELDS, ELLIS K.

It is certified that error appears in the above-identified patent and that said Letters Patent are hereby corrected as shown below:

Column  Line 7   45-51   "  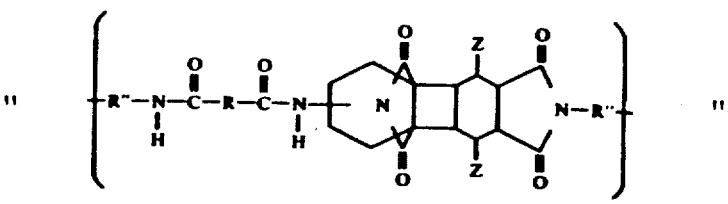  "

should be

-- 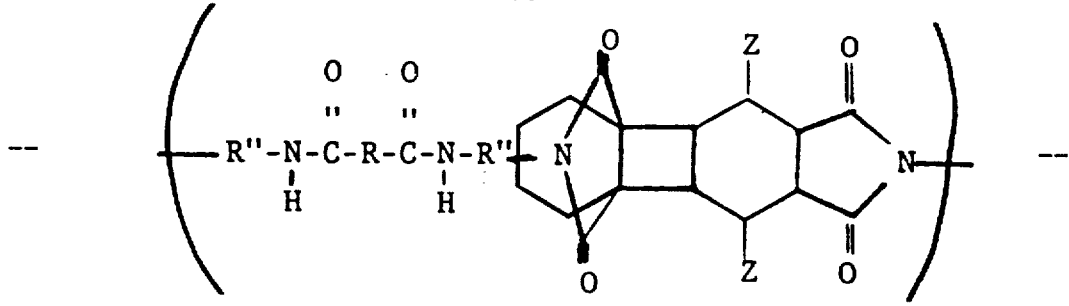 --

UNITED STATES PATENT OFFICE
CERTIFICATE OF CORRECTION

Patent No. 4,417,045   Dated November 22, 1983

Inventor(s) NIMRY, TAYSEER S. - FIELDS, ELLIS K.

It is certified that error appears in the above-identified patent and that said Letters Patent are hereby corrected as shown below:

Column   Line 8   8-14   "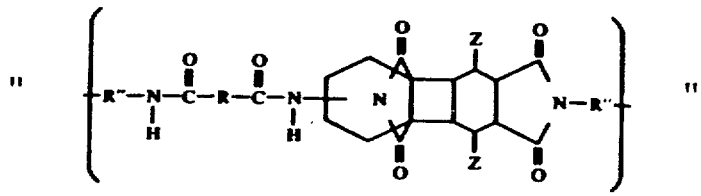"

should be

-- 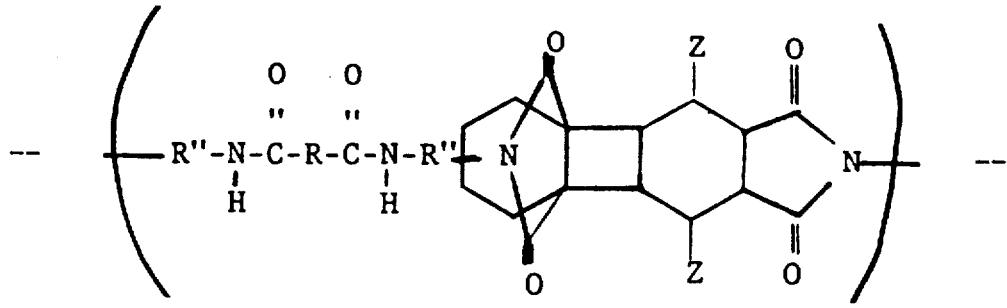 --

Signed and Sealed this

Seventeenth Day of September 1985

[SEAL]

Attest:

Attesting Officer

DONALD J. QUIGG

Commissioner of Patents and Trademarks—Designate